(12) United States Patent
Merson et al.

(10) Patent No.: US 7,359,707 B2
(45) Date of Patent: Apr. 15, 2008

(54) WIRELESS COMMUNICATIONS HANDOFF METHOD AND SYSTEM EMPLOYING SUCH

(75) Inventors: Andrew Charles Merson, San Diego, CA (US); Samuel Bandele Odedina, San Diego, CA (US); Philip Wayne Liddell, Vista, CA (US)

(73) Assignee: Leap Wireless International, Inc., San Diego, CA (US)

(*) Notice: Subject to any disclaimer, the term of this patent is extended or adjusted under 35 U.S.C. 154(b) by 633 days.

(21) Appl. No.: 10/350,162

(22) Filed: Jan. 23, 2003

(65) Prior Publication Data

US 2003/0176189 A1    Sep. 18, 2003

Related U.S. Application Data (60) Provisional application No. 60/351,325, filed on Jan. 23, 2002.

(51) Int. Cl.
*H04Q 7/20* (2006.01)

(52) U.S. Cl. ...................... 455/436; 455/437; 455/438; 455/439; 455/440; 455/441; 455/442; 455/443; 455/444; 455/226.1; 455/226.2; 455/226.3; 455/226.4

(58) Field of Classification Search ........ 455/436–444, 455/226.1–226.4, 402.2, 456.1–457
See application file for complete search history.

(56) References Cited

U.S. PATENT DOCUMENTS

| | | | |
|---|---|---|---|
| 5,943,621 A * | 8/1999 | Ho et al. ................. | 455/456.3 |
| 6,438,376 B1 * | 8/2002 | Elliott et al. ................ | 455/437 |
| 6,493,539 B1 * | 12/2002 | Falco et al. .............. | 455/67.11 |
| 2001/0051527 A1 * | 12/2001 | Kuwahara et al. .......... | 455/456 |
| 2002/0068567 A1 * | 6/2002 | Johansson ................... | 455/436 |
| 2004/0180661 A1 * | 9/2004 | Chen et al. ................. | 455/436 |
| 2005/0153697 A1 * | 7/2005 | Patel .......................... | 455/442 |

\* cited by examiner

*Primary Examiner*—Duc M. Nguyen
*Assistant Examiner*—Justin Lee
(74) *Attorney, Agent, or Firm*—Fish & Richardson P.C.

(57) ABSTRACT

A method for reducing a delay in a wireless communications system resulting from a handoff while mitigating a risk of premature termination of wireless communications, the method includes comparing data indicative of actual use of the wireless communications systems to at least one predetermined criteria. If the comparing determines a sector pairing in the wireless communications system to be statistically significant for purposes of recommending at least one search window setting, at least one value related with a distance associated with the sector pairing may be used to automatically determine a corresponding signal delay. If the corresponding signal delay exceeds a prior determined signal delay, a recommended search window setting may be determined using the corresponding signal delay.

29 Claims, 4 Drawing Sheets

Fig. 1

Prior Art

Fig. 4

WIRELESS COMMUNICATIONS HANDOFF METHOD AND SYSTEM EMPLOYING SUCH

CROSS-REFERENCE TO RELATED APPLICATIONS

This application claims priority to U.S. Provisional Patent Application Ser. No. 60/351,325, filed Jan. 23, 2002.

FIELD OF THE INVENTION

The present invention relates generally to wireless communications, and particularly to handoff methods utilized in wireless communications networks.

BACKGROUND OF THE INVENTION

Many wireless communications networks utilize base stations each positioned to cover a corresponding "cell" within which a wireless communications device may operate. As used herein, the term "wireless communications device" generally refers to any device being suitable for communicating in a wireless fashion using a wireless communications network. Examples of such devices include, but are not limited to: wireless telephones, i.e., handsets, and mobile computing devices including such functionality, such as portable Personal Computers (PCs) and Personal Digital Assistants (PDAs). Further, each cell may be divided into "sectors" as is also well understood.

A cell typically covers a limited geographic area and routes communications between wireless communications devices physically located within the limited geographic area and a telecommunications network, such as a Public Switched Telephone Network (PSTN). When a wireless communications device physically moves from one cell and/or sector to another, a "handoff" may be performed to coordinate operation of the wireless communications device with the new cell and/or sector. Generally, a handoff typically involves negotiating instructions between the moving wireless communications device and one or more base stations and/or mobile switching centers corresponding to the location of the wireless communications device. This serves to keep a communications session, such as a phone call, active as the wireless communications device traverses from one cell and/or sector to another. A handoff may be triggered, for example, when the wireless communications device detects a pilot signal from a different base station that exceeds a given threshold.

Figure 1:
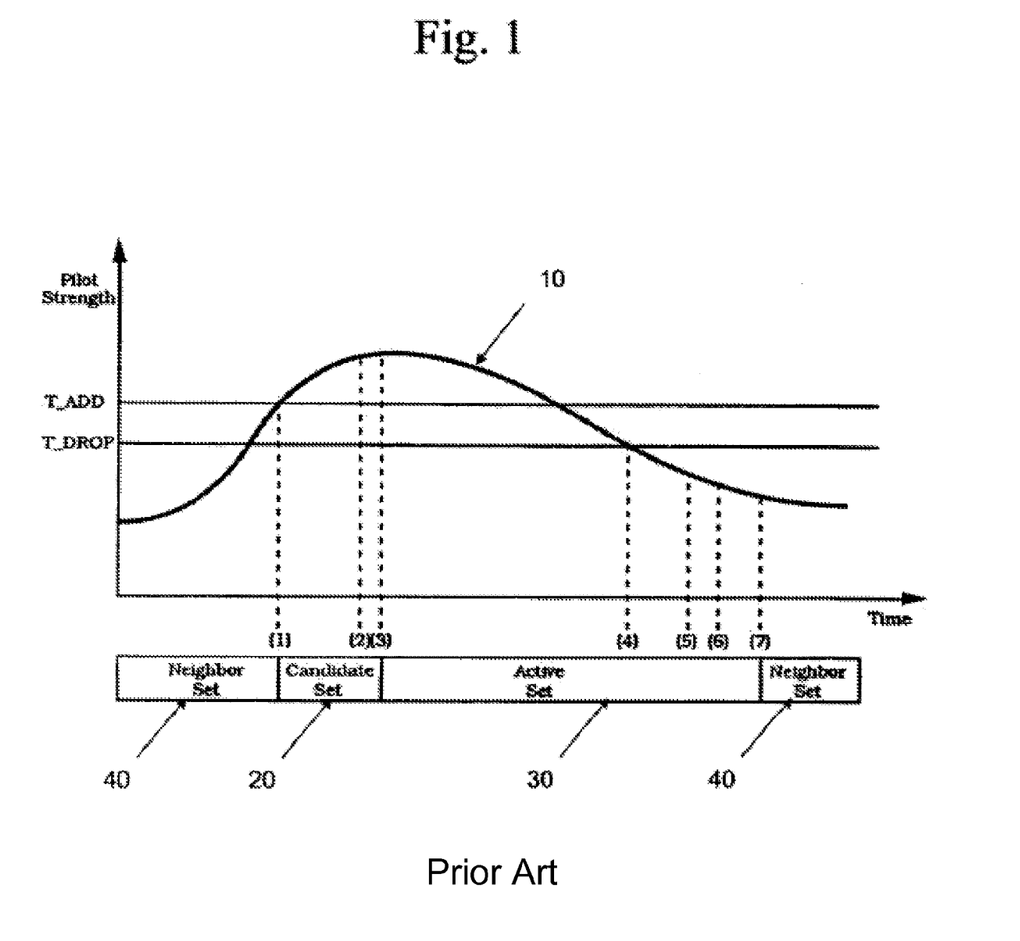
FIG. 1 illustrates a handoff threshold example for a CDMA system as a plot of pilot signal strength versus time.

Referring now to FIG. 1, there is shown an illustration of a handoff threshold example for a CDMA system as a plot of pilot signal strength versus time. At time (1), as the pilot signal strength 10 exceeds a threshold T_ADD, the mobile communications device sends a Pilot Strength Measurement Message and transfer the pilot to a Candidate Set 20. At time (2), the corresponding base station sends a Handoff Direction Message. At time (3), the mobile communications device transfers the pilot to the Active Set 30 and sends a Handoff Completion Message. At time (4), as the pilot signal strength 10 drops below a threshold T_DROP, the mobile communications device starts a handoff drop timer. At time (5), the handoff drop timer expires, and the mobile communications device sends a Pilot Strength Measurement Message. At time (6), the corresponding base station sends a Handoff Direction Message. At time (7), the mobile communications device moves the pilot from the Active Set 30 to the Neighbor Set 40 and sends a Handoff Completion Message. This technique is well understood by those possessing an ordinary skill in the pertinent art.

In a wireless communications network utilizing a Code Division Multiple Access (CDMA) system, a handoff from one cell and/or sector to another involves estimating the timing of a received signal. Wireless communications devices communicating via CDMA systems may experience delays in reception of signals due to the speed of light, reflections, and mobility of the wireless communications devices. When a wireless communications device moves from a first cell to a second cell, a handoff is performed to assign new system resources associated with the second cell. CDMA systems may employ "Search Windows" of a settable length over which to search for the potentially delayed signals. A Search Window is typically set around spreading (or PseudoRandom—PN) sequence phase offsets where geographically adjacent base stations are expected to be transmitting. If a utilized Search Window is set too wide, the searching process can temporally delay handoffs, reducing performance of the wireless communications devices and capacity of the network system. Further, if the Search Window is set too narrow, wireless communications devices may not acquire delayed signals, which may lead to poor performance and dropped communications, such as calls, due to one or more missed handoff opportunities.

Conventionally, two methods for setting Search Windows may be employed: default settings may be used based upon general manufacturer recommendations; or vehicles with test equipment may be moved throughout the cells and sectors and used to collect timing delay information to calculate Search Window settings.

The first method may prove satisfactory for many handoff scenarios, but typically does not provide for even nearly-optimal settings. The second method can provide improved performance over the first method, but, is often expensive, time-consuming, and typically requires large areas to be covered in the data collection process—further driving up costs in both dollars and time.

SUMMARY OF THE INVENTION

A method for reducing a delay in a wireless communications system resulting from a handoff while mitigating a risk of premature termination of wireless communications, the method including: comparing data indicative of actual use of the wireless communications systems to at least one predetermined criteria; if the comparing determines a sector pairing in the wireless communications system to be statistically significant for purposes of recommending at least one search window setting, using at least one value related with a distance associated with the sector pairing to automatically determine a corresponding signal delay; and, if the corresponding signal delay exceeds a prior determined signal delay, determining a recommended search window setting using the corresponding signal delay.

BRIEF DESCRIPTION OF THE FIGURES

The invention will be better understood with reference to the following illustrative and non-limiting drawings, wherein like references identify like elements of the invention, and.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purposes of clarity, many other elements and steps found in typical wireless communications systems and methods. Those of ordinary skill in the art will recognize that other elements and steps are desirable and/or required in order to implement the present invention. However, because such elements and steps are well known in the art, and because they do not facilitate a better understanding of the present invention, a discussion of such elements and steps is not provided herein.

For sake of explanation, the present invention will be discussed as it relates to wireless communications systems and methods employing CDMA and as it relates to handsets. However, it will be well understood by those possessing an ordinary skill in the pertinent arts that other wireless communications devices and wireless communications systems and methods utilizing Search Windows can be adapted to incorporate the present invention as well. Examples of other wireless communications systems and methods include, but are not limited to, other multiple access techniques such as Wideband CDMA (WCDMA), Time Division Multiple Access (TDMA) and Frequency Division Multiple Access (FDMA), as well as other wireless technologies such as Global System for Mobile Communications (GSM) systems and Advance Mobile Phone Service (AMPS) systems.

Many wireless communications system infrastructures, such as those employing CDMA, provide detailed statistical information on handoffs occurring between sectors within a system or collection of systems. The handoff information can be used to set the "Neighbor Lists", e.g., "Neighbor Sets", for each sector. Neighbor Lists are used so wireless communications devices using the system, e.g., handsets, can identify which sectors to search for in the handoff process, in conjunction with the Search Windows. According to an aspect of the present invention, the handoff information and the locations of sectors can be used to estimate an improved Search Window setting.

Figure 2:
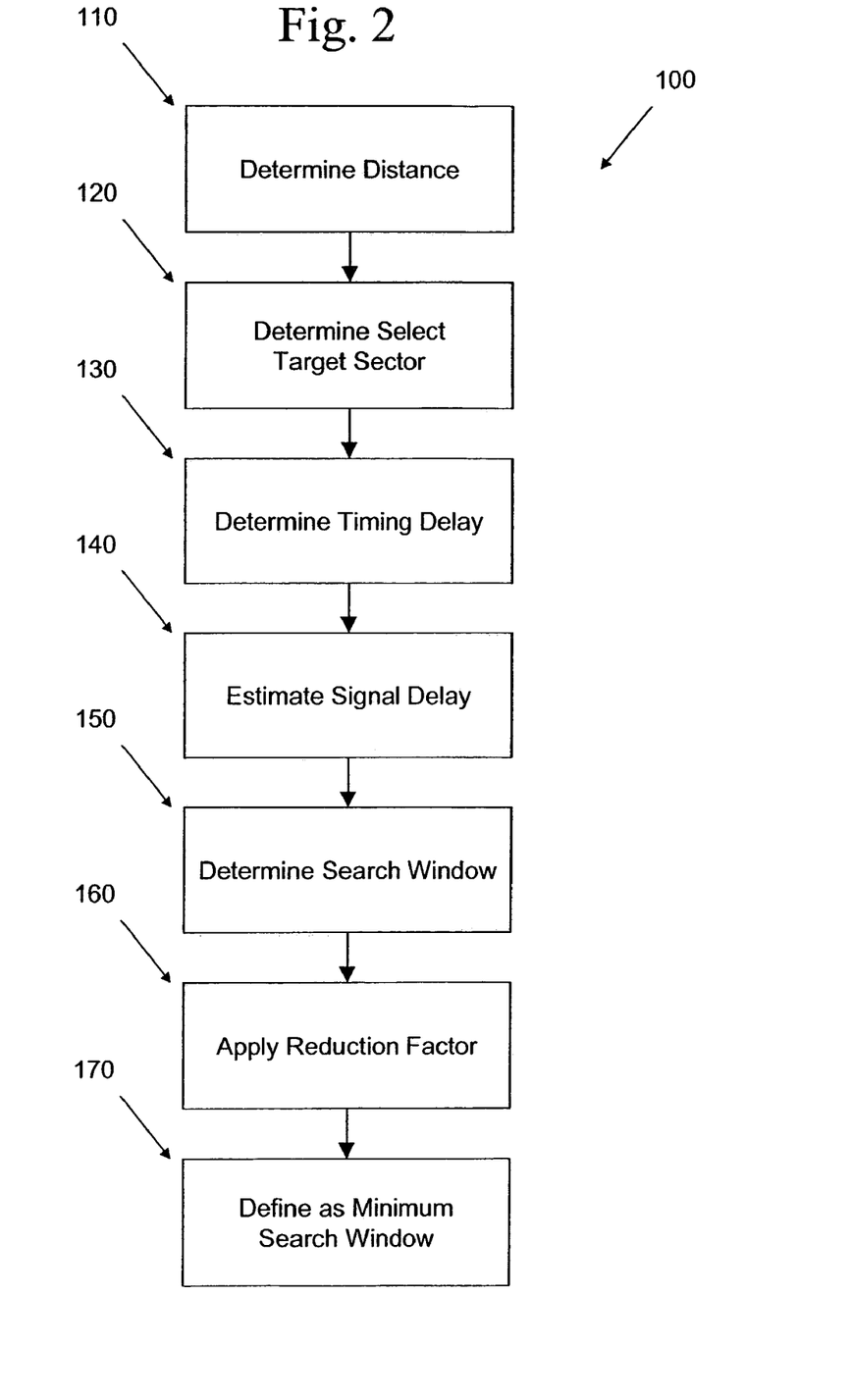
FIG. 2 illustrates a flow diagram of a method according to an aspect of the present invention.

Referring now to FIG. 2, there is shown a flow diagram of a method 100 suitable for setting a Search Window according to an aspect of the present invention. First, a distance between a sector for which the setting is being determined (the "reference sector") and another sector (the "target sector") may be determined 110. According to an aspect of the present invention, a statistically significant target sector can be identified as having a minimum percentage of handoffs that occur with the "target sector" to the total handoffs by the reference sector.

A select "target" sector that is both statistically significant in handoffs and geographically farthest away from the reference sector may then be determined 120. Of course, other target sectors may be determined as a select target sector as well.

A timing delay for the select target sector may then be calculated 130 using a distance corresponding to a distance between the reference and target sectors. This may be accomplished using well known techniques and the speed of light, for example.

An estimate 140 of signal delay caused by signals between the reference and select target sectors reflecting off of distant objects may then be made. Again, this estimation can be accomplished using well known conventional techniques.

A search window may then be determined 150 by adding the determined timing and estimated signal delays, and referencing an appropriate Search Window setting as described in the CDMAOne (TIA/EIA/IS-95) Standard, for example. The entire disclosure of the CDMAOne standard is hereby incorporated by reference as if being set forth in its entirety herein. Of course, other standards, such as 1XRTT could be utilized as well as, or in lieu of, the CDMAOne standard.

A reduction factor can then be applied 160 to the calculated delay depending on well known factors, such as geographic topography or sector layout within the system, for example. The reduction factor may be defined as a percentage reduction in delay, for example. Again, such reductions are well understood by those possessing an ordinary skill in the pertinent arts.

The reduced, calculated search window can then be defined 170 as a minimum search window setting for a collection of sectors including the reference and target sectors, and/or the wireless communications system, for example. This provides a search window setting recommendation that is substantially optimized for each sector in the collection, or system for example. As will be readily understood by those possessing an ordinary skill in the pertinent arts, such a defined minimum search window setting should reasonably ensure that handoffs occur with a reduced delay, yet avoid non-detection of delayed signals.

According to an aspect of the present invention, one or more computer programs, e.g., sequence of operational steps in a machine readable language or form, can be used in combination with any suitable computing device or combination of devices to perform the method. The one or more computer programs can be stored using any suitable computer readable medium. Further, the computing devices may include, or further utilize, one or more computer readable mediums including data to be used by the one or more computer programs, such as data indicative of an appropriate Search Window setting as described in the CDMAOne (TIA/EIA/IS-95) Standard and above and/or one or more of the reduction factors, for example.

According to an aspect of the present invention, the present method, and/or one or more computer programs, may be instantiated one or more times, either in response to a user request therefore, or automatically based upon one or more criteria. Exemplary criteria include, but are not limited to, changes in one or more reduction factors, changes in data utilized and/or at predetermined temporal intervals, for example.

Figure 3:
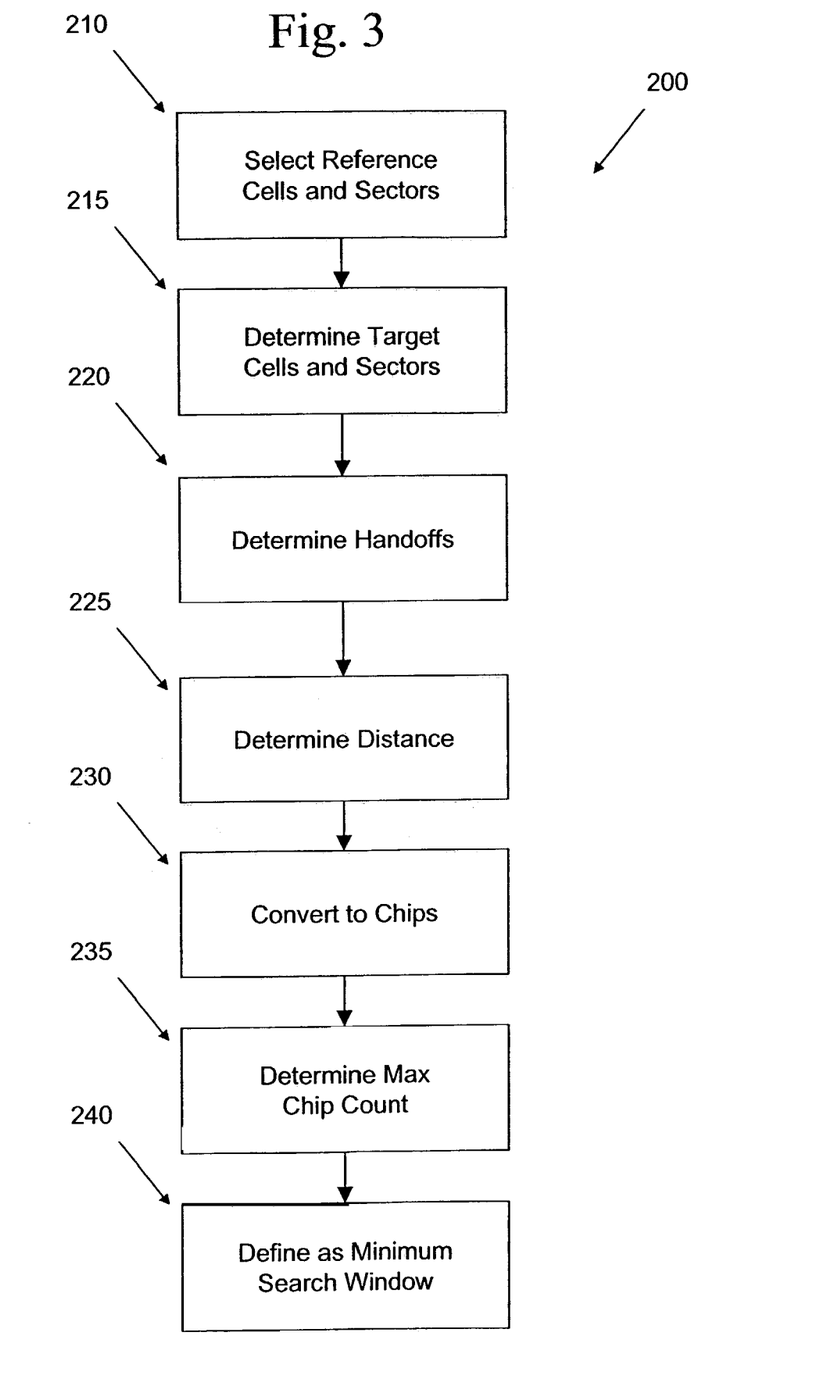
FIG. 3 illustrates a flow diagram of a method according to an aspect of the present invention; and, FIG. 4 illustrates a flow diagram of a method according to an aspect of the present invention.

Referring now to FIG. 3, there is illustrated a flow diagram of a method 200 according to an aspect of the present invention. The method 200 of FIG. 3 will be discussed with reference to Table-1. As will be readily understood by those possessing an ordinary skill in the pertinent art, Table-1 illustrates a portion of a larger table, which may be prepared using a commercially available spreadsheet program, such as Microsoft Excel. The illustrated Table-1 has been limited to analyze a single cell 1 having three sectors, A, B and G for sake of clarity.

TABLE 1

| R.CELL (300) | R.SEC. (305) | T.CELL (310) | T.SEC. (315) | HO FWD. (320) | HO REV. (325) | HO % FWD. (330) | CUM % FWD (335) | DIST.(KM) (340) | CHIPS (345) | MAX.CHIPS (350) |
|---|---|---|---|---|---|---|---|---|---|---|
| 1 | A | 36 | G | 2566 | 4013 | 28.08 | 28.08 | 4.238746769 | 7 | 7 |
| 1 | A | 46 | B | 1669 | 1191 | 18.26 | 46.34 | 4.26919653 | 7 | 7 |
| 1 | A | 1 | G | 843 | 3996 | 9.23 | 55.57 | 0 | 0 | 7 |
| 1 | A | 1 | B | 694 | 1815 | 7.59 | 63.16 | 0 | 0 | 7 |
| 1 | A | 104 | A | 673 | 357 | 7.36 | 70.53 | 4.553619534 | 7 | 7 |
| 1 | A | 46 | G | 666 | 747 | 7.29 | 77.82 | 4.26919653 | 7 | 7 |
| 1 | A | 17 | B | 591 | 156 | 6.47 | 84.29 | 6.780116522 | 8 | 8 |
| 1 | A | 36 | A | 337 | 486 | 3.69 | 87.97 | 4.238746769 | 7 | 8 |
| 1 | A | 116 | B | 212 | 182 | 2.32 | 90.29 | 5.057733638 | 8 | 8 |
| 1 | A | 115 | A | 146 | 268 | 2.06 | 92.35 | 7.115110949 | 8 | 8 |
| 1 | A | 105 | B | 181 | 152 | 2 | 94.35 | 6.490139585 | 8 | 8 |
| 1 | A | 39 | G | 142 | 466 | 1.55 | 95.91 | 7.104659383 | 8 | 8 |
| 1 | A | 36 | B | 89 | 821 | 0.97 | 96.88 | 4.238746769 | 7 | 8 |
| 1 | A | 5 | B | 83 | 3 | 0.93 | 97.81 | 8.679315764 | 9 | 8 |
| 1 | A | 100 | A | 57 | 479 | 0.62 | 98.44 | 2.982138282 | 6 | 8 |
| 1 | A | 5 | A | 53 | 2 | 0.58 | 99.02 | 8.679315764 | 9 | 8 |
| 1 | A | 116 | A | 31 | 18 | 0.34 | 99.35 | 5.057733638 | 8 | 8 |
| 1 | A | 39 | B | 28 | 66 | 0.31 | 99.66 | 7.104659383 | 8 | 8 |
| 1 | A | 68 | B | 10 | 81 | 0.11 | 99.77 | 7.006377342 | 8 | 8 |
| 1 | A | 41 | G | 6 | 9 | 0.07 | 99.84 | 6.687386515 | 8 | 8 |
| 1 | A | 3 | G | 4 | 1 | 0.05 | 99.89 | 8.597521298 | 9 | 8 |
| 1 | A | 40 | G | 2 | 1 | 0.02 | 99.91 | 11.32394623 | 10 | 8 |
| 1 | A | 46 | A | 2 | 19 | 0.02 | 99.93 | 4.26919653 | 7 | 8 |
| 1 | A | 124 | A | 2 | 3 | 0.02 | 99.96 | 10.43178857 | 10 | 8 |
| 1 | A | 105 | G | 1 | 0 | 0.01 | 99.97 | 6.490139585 | 8 | 8 |
| 1 | A | 17 | A | 1 | 4 | 0.01 | 99.98 | 6.780116522 | 8 | 8 |
| 1 | A | 104 | G | 1 | 0 | 0.01 | 99.99 | 4.553619534 | 7 | 8 |
| 1 | A | 41 | A | 1 | 0 | 0.01 | 100 | 6.687386515 | 8 | 8 |
| 1 | A | 5 | G | 0 | 1 | 0 | 100 | 8.679315764 | 9 | 8 |
| 1 | A | 39 | A | 0 | 2 | 0 | 100 | 7.104659383 | 8 | 8 |
| 1 | A | 68 | G | 0 | 2 | 0 | 100 | 7.006377342 | 8 | 8 |
| 1 | A | 116 | G | 0 | 1 | 0 | 100 | 5.057733638 | 8 | 8 |
| 1 | A | 68 | A | 0 | 5 | 0 | 100 | 7.006377342 | 8 | 8 |
| 1 | A | 124 | B | 0 | 1 | 0 | 100 | 10.43178857 | 10 | 8 |
| 1 | A | 100 | G | 0 | 1 | 0 | 100 | 2.982138282 | 6 | 8 |
| 1 | A | 17 | G | 0 | 3 | 0 | 100 | 6.780116522 | 8 | 8 |
| 1 | A | 53 | B | 0 | 1 | 0 | 100 | 8.821774911 | 9 | 8 |
| 1 | A | 124 | G | 0 | 1 | 0 | 100 | 10.43178857 | 10 | 8 |
| 1 | A | 53 | A | 0 | 0 | 0 | 100 | 8.821774911 | 9 | 0 |
| 1 | B | 1 | G | 4354 | 4307 | 26.57 | 26.57 | 0 | 0 | 0 |
| 1 | B | 100 | A | 3001 | 2500 | 18.31 | 44.88 | 2.982138282 | 6 | 7 |
| 1 | B | 104 | G | 1986 | 990 | 12.12 | 57 | 4.553619534 | 7 | 7 |
| 1 | B | 1 | A | 1815 | 694 | 11.08 | 68.08 | 0 | 0 | 7 |
| 1 | B | 100 | G | 1179 | 951 | 7.19 | 75.27 | 2.982138282 | 6 | 7 |
| 1 | B | 125 | A | 1177 | 1041 | 7.18 | 82.46 | 10.67026533 | 10 | 10 |
| 1 | B | 46 | G | 696 | 248 | 4.41 | 86.87 | 4.26919653 | 7 | 10 |
| 1 | B | 36 | G | 537 | 301 | 3.28 | 90.14 | 4.238746769 | 7 | 10 |
| 1 | B | 17 | B | 404 | 331 | 2.6 | 92.74 | 6.780116522 | 8 | 10 |
| 1 | B | 104 | A | 425 | 312 | 2.59 | 95.34 | 4.553619534 | 7 | 10 |
| 1 | B | 82 | G | 205 | 557 | 1.25 | 96.59 | 8.351849252 | 9 | 10 |
| 1 | B | 68 | B | 185 | 55 | 1.17 | 97.76 | 7.006377342 | 8 | 10 |
| 1 | B | 100 | B | 131 | 246 | 0.8 | 98.56 | 2.982138282 | 6 | 10 |
| 1 | B | 108 | G | 84 | 53 | 0.51 | 99.07 | 9.766789214 | 10 | 10 |
| 1 | B | 39 | G | 32 | 14 | 0.2 | 99.27 | 7.104659383 | 8 | 10 |
| 1 | B | 116 | B | 24 | 9 | 0.19 | 99.46 | 5.057733638 | 8 | 10 |
| 1 | B | 33 | G | 18 | 10 | 0.11 | 99.57 | 7.562384801 | 9 | 10 |
| 1 | B | 31 | G | 16 | 10 | 0.1 | 99.66 | 11.56147212 | 10 | 10 |
| 1 | B | 46 | B | 15 | 15 | 0.09 | 99.76 | 4.26919653 | 7 | 10 |
| 1 | B | 134 | A | 14 | 10 | 0.09 | 99.84 | 16.71266896 | 12 | 10 |
| 1 | B | 125 | B | 8 | 30 | 0.05 | 99.89 | 10.67026533 | 10 | 10 |
| 1 | B | 82 | A | 5 | 6 | 0.03 | 99.92 | 8.351849252 | 9 | 10 |
| 1 | B | 104 | B | 4 | 5 | 0.02 | 99.95 | 4.553619534 | 7 | 10 |
| 1 | B | 36 | B | 3 | 5 | 0.02 | 99.96 | 4.238746769 | 7 | 10 |
| 1 | B | 124 | A | 2 | 0 | 0.01 | 99.98 | 10.43178857 | 10 | 10 |
| 1 | B | 105 | B | 2 | 0 | 0.01 | 99.99 | 6.490139585 | 8 | 10 |
| 1 | B | 82 | B | 1 | 1 | 0.01 | 99.99 | 8.351849252 | 9 | 10 |
| 1 | B | 17 | A | 1 | 2 | 0.01 | 100 | 6.780116522 | 8 | 10 |
| 1 | B | 125 | G | 0 | 10 | 0 | 100 | 10.67026533 | 10 | 10 |
| 1 | B | 46 | A | 0 | 1 | 0 | 100 | 4.26919653 | 7 | 10 |
| 1 | B | 135 | A | 0 | 1 | 0 | 100 | 19.58037433 | 13 | 10 |
| 1 | B | 57 | G | 0 | 0 | 0 | 100 | 10.05361698 | 10 | 10 |
| 1 | B | 116 | A | 0 | 0 | 0 | 100 | 5.057733638 | 8 | 10 |
| 1 | B | 57 | A | 0 | 0 | 0 | 100 | 10.05361698 | 10 | 10 |
| 1 | B | 57 | B | 0 | 0 | 0 | 100 | 10.05361698 | 10 | 10 |
| 1 | B | 124 | B | 0 | 0 | 0 | 100 | 10.43178857 | 10 | 10 |
| 1 | G | 1 | B | 4307 | 4354 | 18.72 | 18.72 | 0 | 0 | 0 |

TABLE 1-continued

| R.CELL (300) | R.SEC. (305) | T.CELL (310) | T.SEC. (315) | HO FWD. (320) | HO REV. (325) | HO % FWD. (330) | CUM % FWD (335) | DIST.(KM) (340) | CHIPS (345) | MAX.CHIPS (350) |
|---|---|---|---|---|---|---|---|---|---|---|
| 1 | G | 100 | A | 4155 | 2311 | 18.06 | 36.77 | 2.982138282 | 6 | 6 |
| 1 | G | 1 | A | 3996 | 843 | 17.36 | 54.13 | 0 | 0 | 6 |
| 1 | G | 68 | B | 2264 | 3925 | 9.84 | 63.97 | 7.006377342 | 8 | 8 |
| 1 | G | 17 | B | 1939 | 3557 | 8.43 | 72.4 | 6.780116522 | 8 | 8 |
| 1 | G | 46 | G | 1798 | 965 | 7.81 | 80.21 | 4.26919653 | 7 | 8 |
| 1 | G | 36 | G | 963 | 922 | 4.18 | 84.4 | 4.238746769 | 7 | 8 |
| 1 | G | 17 | A | 832 | 753 | 3.62 | 88.01 | 6.780116522 | 8 | 8 |
| 1 | G | 46 | A | 518 | 1118 | 2.25 | 90.26 | 4.26919653 | 7 | 8 |
| 1 | G | 104 | G | 393 | 162 | 1.85 | 92.11 | 4.553619534 | 7 | 8 |
| 1 | G | 100 | G | 405 | 332 | 1.76 | 93.87 | 2.982138282 | 6 | 8 |
| 1 | G | 124 | A | 368 | 283 | 1.6 | 95.47 | 10.43178857 | 10 | 10 |
| 1 | G | 116 | G | 366 | 195 | 1.59 | 97.06 | 5.057733638 | 8 | 10 |
| 1 | G | 104 | A | 259 | 31 | 1.19 | 98.25 | 4.553619534 | 7 | 10 |
| 1 | G | 39 | G | 143 | 38 | 0.67 | 98.92 | 7.104659383 | 8 | 10 |
| 1 | G | 68 | G | 104 | 280 | 0.45 | 99.37 | 7.006377342 | 8 | 10 |
| 1 | G | 125 | A | 92 | 130 | 0.44 | 99.81 | 10.67026533 | 10 | 10 |
| 1 | G | 116 | B | 21 | 6 | 0.09 | 99.9 | 5.057733638 | 8 | 10 |
| 1 | G | 46 | B | 7 | 47 | 0.03 | 99.93 | 4.26919653 | 7 | 10 |
| 1 | G | 82 | G | 4 | 6 | 0.02 | 99.95 | 8.351849252 | 9 | 10 |
| 1 | G | 124 | G | 3 | 142 | 0.01 | 99.97 | 10.43178857 | 10 | 10 |
| 1 | G | 98 | A | 2 | 0 | 0.01 | 99.97 | 10.28754167 | 10 | 10 |
| 1 | G | 82 | A | 2 | 1 | 0.01 | 99.98 | 8.351849252 | 9 | 10 |
| 1 | G | 134 | A | 1 | 0 | 0 | 99.99 | 16.71266896 | 12 | 10 |
| 1 | G | 100 | B | 1 | 2 | 0 | 99.99 | 2.982138282 | 6 | 10 |
| 1 | G | 5 | B | 1 | 2 | 0 | 100 | 8.679315764 | 9 | 10 |
| 1 | G | 105 | B | 1 | 3 | 0 | 100 | 6.490139585 | 8 | 10 |
| 1 | G | 115 | A | 0 | 5 | 0 | 100 | 7.115110949 | 8 | 10 |
| 1 | G | 124 | B | 0 | 5 | 0 | 100 | 10.43178857 | 10 | 10 |
| 1 | G | 68 | A | 0 | 8 | 0 | 100 | 7.006377342 | 8 | 10 |
| 1 | G | 17 | G | 0 | 42 | 0 | 100 | 6.780116522 | 8 | 10 |
| 1 | G | 36 | A | 0 | 1 | 0 | 100 | 4.238746769 | 7 | 10 |

According to an aspect of the present invention, reference cells and sectors of a wireless communications system may be selected for analysis 210. The cells and sectors chosen may be a subset of all cells and sectors in the system or may include all, or substantially all, of the cells and sectors in the system. Reference cells chosen for analysis are illustrated in column 300 of Table 1, while reference sectors are shown in column 305. In the illustrated example, analysis of only a single cell 1, having three sectors (A, B and G) is shown for purposes of clarity. Of course, in practicing the present invention more than one cell, each having a suitable number of sectors, may be analyzed.

Target cells and sectors may be determined 215. The target cells chosen for analysis are illustrated in column 310 of Table 1, while the target sectors are shown in column 315.

A number of handoffs between each selected reference cell to each determined target cell may then be determined 220. This may be accomplished using any suitable technique. For example, data indicative of these handoffs may be provided by the wireless network infrastructure, such as by switches for example. Alternatively, the handoffs may be estimated using techniques understood by those possessing an ordinary skill in the pertinent arts. Data indicative of the forward handoffs (from reference to target) is illustrated in column 320 of Table 1, while data indicative of reverse handoffs (from target to reference) is shown in column 325.

A percentage of the total handoffs for the reference cell and sector that the determined number of forward handoffs (from the target to the reference) comprise may then be determined 225. Again, this may be accomplished using any suitable technique. For example, data indicative of these handoffs may be provided by the wireless network infrastructure, such as by switches for example. Alternatively, these percentages may be estimated using techniques understood by those possessing an ordinary skill in the pertinent arts. Data indicative of the percentage that these forward handoffs (from reference to target) make up of the total number of handoffs for the cell and sector is illustrated in column 330 of Table 1. Data indicative of the cumulative of percentages illustrated in column 330 for each cell and sector is illustrated in column 335 of Table 1.

As set forth, the determining whether a sector-sector pairing is statistically significant can be accomplished using any suitable technique. For example, if the total number of forward handoffs between the sector-sector pairing exceeds a given threshold percentage of the total handoffs for the reference sector, such as one percent for example, the sector-sector pairing can be determined to be statistically significant. This percentage may further be variable, rather than fixed. For example, of the average neighbor list size exceeds a threshold, such as when approaching twenty for example, the percentage may be increased, such as to one and one-half percent, for example. Analogously, if an average neighbor list size is below a given threshold, the percentage may be decreased, such as to one-half percent, for example. Of course, any suitable percentage as determined by one having an ordinary skill in the art, may be utilized.

As set forth above, a distance between the reference and target cells and sectors may determined 225 using any suitable technique. For example, where each cell and sector is at a known geo-location, the distance measurements can be performed automatically using well known techniques and data indicative of these geo-locations. Data indicative of the distances determined is illustrated in column 340 of Table-1.

The distance determined 225 may then be converted 230 into a number of chips indicative of symbol delay in communications associated with the reference and target cells and sectors as is well understood by those possessing an ordinary skill in the pertinent art. Again, this may be accomplished automatically using well known algorithms. Data indicative of a number of chips corresponding to the distances determined 225 is shown in column 345 of Table-1. According to an aspect of the present invention, the distance converted may correspond to the actual distance determined between the sectors, e.g., between towers as determined by their respective geo-locations. According to an aspect of the present invention, the distance converted may correspond to an actual distance between sectors having a scaling factor applied to it. The applied scaling factor may be greater or less than 1, such as 0.8 or 1.2, for example).

If a reference and target cell and sector pairing is determined to have a statistically significant number of handoffs, using the percentages determined in step 225 for example, and the converted chips 230 exceeds a previously determined maximum chip count, then the converted 230 chips can be used to determine, i.e., ratchet up, 235 a maximum chip count. If the target cell and sector pairing is determined not to have a statistically significant number of handoffs, and/or the converted chips 230 do not exceed a previously determined maximum chip count, the converted chips can be disregarded for purposes of setting the maximum chip count. Data indicative of a maximum chip count is shown in column 350 of Table-1.

The maximum chip count determined 235 can then be used, in combination with an appropriate Search Window to set a minimum search window 240 as has been discussed with regard to FIG. 2.

Figure 4:
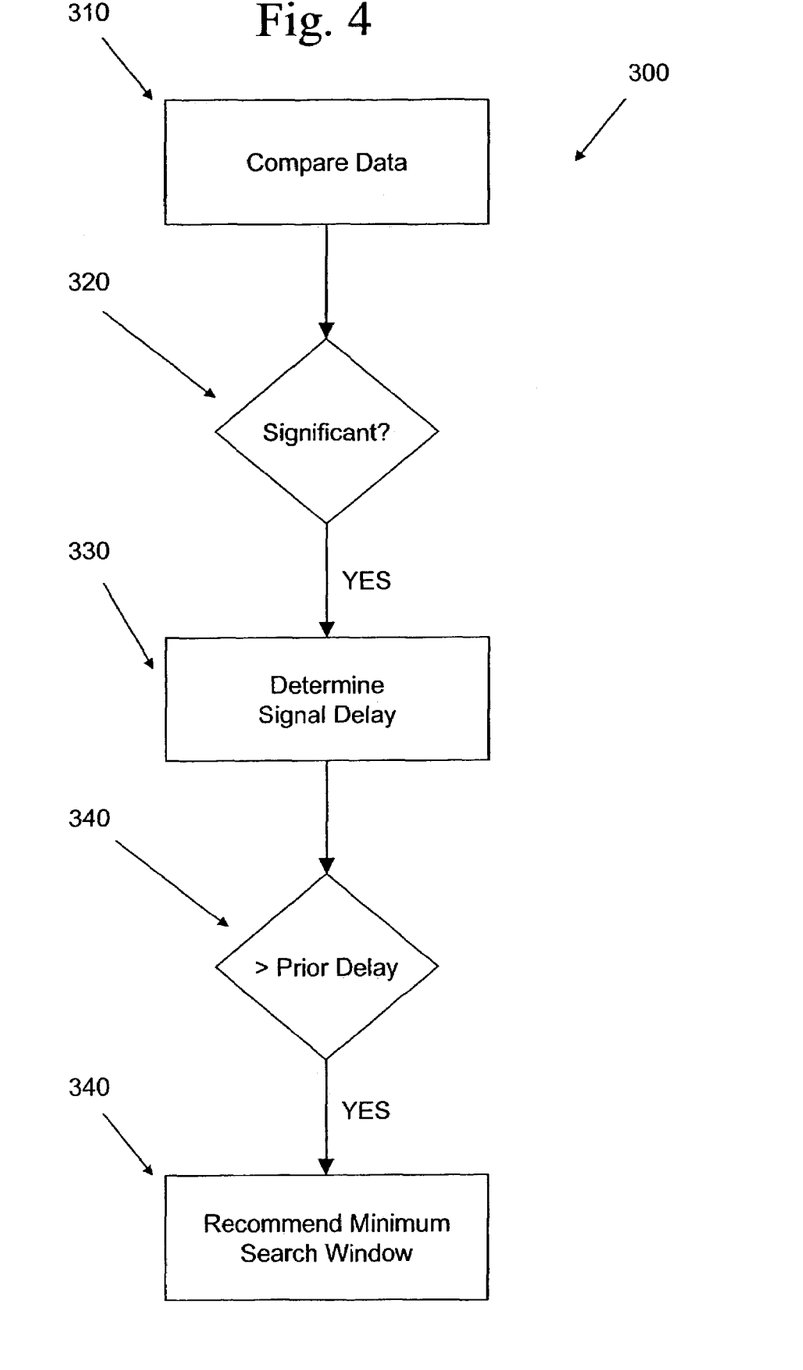

Referring now to FIG. 4, there is illustrated a flow diagram of a method 300 according to an aspect of the present invention. According to an aspect of the present invention, a search window setting can be recommended so as to reduce a delay in a wireless communications system resulting from a handoff while mitigating a risk of premature termination of wireless communications.

According to an aspect of the present invention, statistical data compiled using, and indicative of, actual subscriber use (collected by a switch or other network device, for example) may be used to determine statistically significant pairings of sectors. As will be readily understood by those possessing an ordinary level of skill in the art, the data can be collected, compiled and/or provided using a wireless communications system switch, or any other suitable device collecting and/or compiling data indicative of actual user information. For sake of clarity, the present disclosure is by way of the amount of handoffs occurring between each sector on a hourly, daily, weekly, or other timeframe basis to determine statistical significance, for example. Of course, other types of information collected using the network, and not just handoff information, may be utilized in lieu of, or in addition to, handoff information.

According to an aspect of the present invention, data output from at least one switch in the wireless communications system may be compared 310 to at least one predetermined criteria, such as a threshold, so as to determine whether a sector pairing in the wireless communications system (e.g., reference sector-target sector pairing) is statistically significant for purposes of setting a search window. If the sector pairing is statistically significant 320, at least one value related with a distance associated with the sector pairing, such as a distance between towers which may or may not have a scaling factor applied to it, may be used to determine 330 a corresponding signal delay. If the corresponding signal delay exceeds a prior determined signal delay 340, corresponding to another sector pairing for example, a search window setting may be recommended 350 using the corresponding signal delay.

Although the invention has been described and pictured in a preferred form with a certain degree of particularity, it is understood that the present disclosure of the preferred form has been made by way of example, and that numerous changes in the details of construction and combination and arrangement of parts and steps may be made without departing from the spirit and scope of the invention as is hereinafter claimed.

We claim:

1. A method for reducing a delay in a wireless communications system resulting from a handoff while mitigating a risk of premature termination of wireless communications, said method comprising:

identifying a plurality of communications sectors, each of said sectors having a geographic relationship with respect to each other of said sectors;

automatically determining whether a number of handoffs between at least two of said plurality of sectors exceeds a threshold;

automatically determining a distance between said at least two sectors using said geographic relationship between said at least two sectors and converting said distance to a corresponding signal delay; and, if said number of handoffs exceeds said threshold and said converted corresponding signal delay exceeds a prior determined signal delay, recommending a minimum search window based upon said converted corresponding signal delay.

2. The method of claim 1, wherein said recommending comprises comparing said converted corresponding signal delay to predetermined criteria.

3. The method of claim 1, further comprising reducing said converted corresponding delay.

4. The method of claim 3, wherein said reducing is dependent upon at least one reduction factor.

5. The method of claim 4, wherein said reduction factor is at least partially based upon a geographic topography.

6. The method of claim 4, wherein said reduction factor is at least partially based upon a layout of at least some of said plurality of sectors.

7. The method of claim 1, wherein said wireless communications system comprises a multiple access communications network.

8. The method of claim 7, wherein said multiple access communications network comprises at least one of: a CDMA communications network, a WCDMA communications network, a TDMA communications network, an FDMA communications network, a GSM communications network and an AMPS communications network.

9. A computer-readable medium encoded with a computer program for reducing a delay in a wireless communications system resulting from a handoff while mitigating a risk of premature termination of wireless communications, the computer program comprising:

code for storing data indicative of a plurality of communications sectors, each of said sectors having a geographic relationship with respect to each other of said sectors;

code for automatically determining whether a number of handoffs between at least two of said plurality of sectors exceeds a threshold;

code for automatically determining a distance between said at least two sectors using said geographic relationship between said at least two sectors and converting said distance to a corresponding signal delay; and, code for recommending a minimum search window based upon said converted corresponding signal delay if said number of handoffs exceeds said threshold and said converted corresponding signal delay exceeds a prior determined signal delay.

10. The computer program of claim 9, further comprising code for automatically accessing data indicative of said geographic relationship between said at least two sectors.

11. The computer program of claim 10, further comprising code for storing said data indicative of said geographic relationship between said at least two sectors.

12. The computer program of claim 9, wherein the code for recommending a minimum search window further comprises code for comparing said converted corresponding signal delay to predetermined criteria.

13. The computer program of claim 9, further comprising code for reducing said converted corresponding delay.

14. The computer program of claim 13, wherein said code for reducing accesses at least one reduction factor on which said reducing depends.

15. The computer program of claim 14, wherein said reduction factor is at least partially based upon a geographic topography.

16. The computer program of claim 14, wherein said reduction factor is at least partially based upon a layout of at least some of said plurality of sectors.

17. The computer program of claim 9, wherein said wireless communications system comprises a multiple access communications network.

18. The computer program of claim 17, wherein said multiple access communications network comprises at least one of: a CDMA communications network, a WCDMA communications network, a TDMA communications network, an FDMA communications network, a GSM communications network and an AMPS communications network.

19. A method for reducing a delay in a wireless communications system resulting from a handoff while mitigating a risk of premature termination of wireless communications, said method comprising:

comparing data indicative of actual use of said wireless communications system to at least one predetermined criteria;

if said comparing determines a sector pairing in said wireless communications system to be statistically significant for purposes of recommending at least one search window setting, using at least one value related with a distance associated with said sector pairing to automatically determine a corresponding signal delay; and if said corresponding signal delay exceeds a prior determined signal delay, determining a recommended search window setting using said corresponding signal delay.

20. A system for reducing a delay in wireless communications resulting from a handoff while mitigating a risk of premature termination of wireless communications, the system comprising:

a wireless communications system including a plurality of communications sectors; and processor electronics configured to perform operations comprising:

identifying a plurality of communications sectors, each of said communications sectors having a geographic relationship with respect to each other of said communications sectors;

automatically determining whether a number of handoffs between at least two of said plurality of communications sectors exceeds a threshold;

automatically determining a distance between said at least two communications sectors using said geographic relationship between said at least two communications sectors and converting said distance to a corresponding signal delay; and if said number of handoffs exceeds said threshold and said converted corresponding signal delay exceeds a prior determined signal delay, recommending a minimum search window based upon said converted corresponding signal delay.

21. The system of claim 20, wherein said processor electronics configured to perform operations comprising recommending are further configured to compare said converted corresponding signal delay to predetermined criteria.

22. The system of claim 20, wherein said processor electronics are further configured to perform operations comprising reducing said converted corresponding delay.

23. The system of claim 22, wherein said processor electronics are further configured to perform operations comprising reducing dependent on at least one reduction factor.

24. The system of claim 23, wherein said reduction factor is at least partially based on a geographic topography.

25. The system of claim 23, wherein said reduction factor is at least partially based on a layout of at least some of said plurality of sectors.

26. The system of claim 20, wherein said wireless communications system comprises a multiple access communications network.

27. The system of claim 26, wherein said multiple access communications network comprises at least one of: a CDMA communications network, a WCDMA communications network, a TDMA communications network, an FDMA communications network, a GSM communications network and an AMPS communications network.

28. A computer readable medium encoded with a computer program for reducing a delay in a wireless communications system resulting from a handoff while mitigating a risk of premature termination of wireless communications, the computer program operable to cause data processing apparatus to perform operations comprising:

comparing data indicative of actual use of a wireless communications system to at least one predetermined criteria;

if said comparing determines a sector pairing in said wireless communications system to be statistically significant for purposes of recommending at least one search window setting, using at least one value related with a distance associated with said sector pairing to automatically determine a corresponding signal delay; and if said corresponding signal delay exceeds a prior determined signal delay, determining a recommended search window setting using said corresponding signal delay.

29. A system for reducing a delay in wireless communications resulting from a handoff while mitigating a risk of premature termination of wireless communications, the system comprising:

a wireless communications system including a plurality of sectors; and processor electronics configured to perform operations
comprising:
comparing data indicative of actual use of said wireless communications system to at least one predetermined criteria;
if said comparing determines a sector pairing in said wireless communications system to be statistically significant for purposes of recommending at least one search window setting, using at least one value related with a distance associated with said sector pairing to automatically determine a corresponding signal delay; and
if said corresponding signal delay exceeds a prior determined signal delay, determining a recommended search window setting using said corresponding signal delay.

* * * * *